United States Patent
Hoppenbrouwers et al.

(10) Patent No.: US 6,985,126 B2
(45) Date of Patent: Jan. 10, 2006

(54) MOTION COMPENSATED UPCONVERSION FOR PLASMA DISPLAYS

(75) Inventors: Jurgen Jean Louis Hoppenbrouwers, Eindhoven (NL); Roel Van Woudenberg, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 397 days.

(21) Appl. No.: 10/205,558

(22) Filed: Jul. 25, 2002

(65) Prior Publication Data
US 2003/0146885 A1 Aug. 7, 2003

(30) Foreign Application Priority Data
Jul. 30, 2001 (EP) ............................................ 01202894

(51) Int. Cl.
*G09G 345/60* (2006.01)

(52) U.S. Cl. .......................... 345/60; 348/447; 348/607; 375/240.16; 375/240.12

(58) Field of Classification Search ................. 348/607, 348/447; 375/240.16, 240.12; 345/60, 474
See application file for complete search history.

(56) References Cited

U.S. PATENT DOCUMENTS 6,442,203 B1 * 8/2002 Demos ................... 375/240.16
6,476,875 B2 * 11/2002 Correa et al. ................ 348/607
6,714,250 B1 * 3/2004 Correa et al. ................ 348/447

FOREIGN PATENT DOCUMENTS

EP 0822536 A 2/1998

OTHER PUBLICATIONS

T. Tokunaga et al., "Development of new driving method for AC–PDPs: High–Contrast, Low Energy Address and Reduction of False Contour Sequence CLEAR", Proceedings of the IDW '99, pp. 787–790.

B. Slaters et al., "Reduction of large area flicker in plasma display panels", Proceedings of the SID 2001, pp. 1098–1101, 2001, San Jose.

H. Kuriyama et al., "A 50 Hz flicker reduction for PDP and evaluation system development", Proceedings of the SID 2001, pp. 1102–1105, 2001, San Jose.

R. van Dijk and T. Holtslag, "Motion Compensation in Plasma Displays", Proceedings of the IDW 1998, pp. 543–545.

* cited by examiner

*Primary Examiner*—Sumati Lefkowitz
*Assistant Examiner*—Ming-Hun Lin

(57) ABSTRACT

A method for driving a PDP minimizes motion artifacts, like blur and double edges, by using an up-conversion to preferably 100 Hz as in CRTs with Natural Motion, combined with an LSC sub-field distribution. Sub-field groups from two images are combined to form a field for a display image.

11 Claims, 4 Drawing Sheets

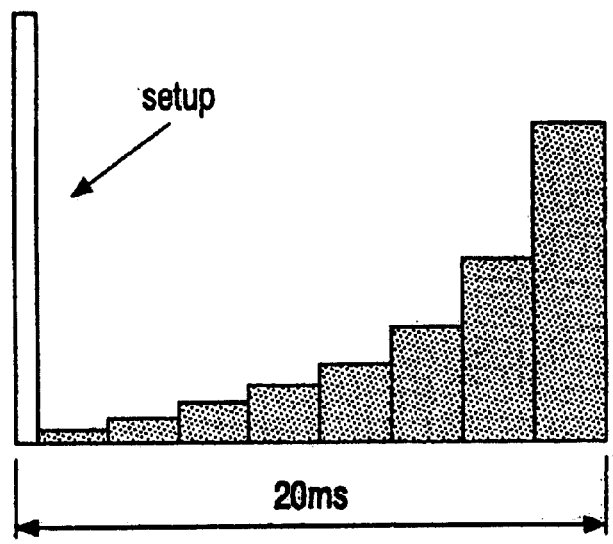
PRIOR ART FIG. 1a
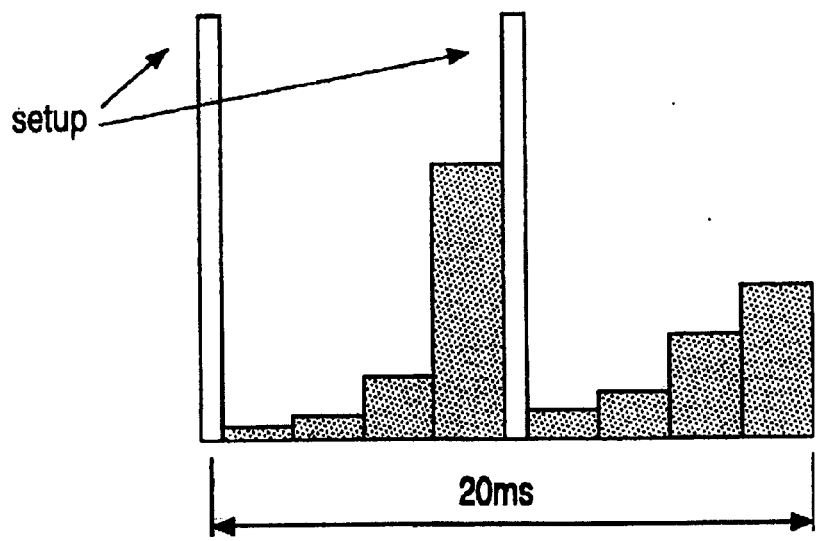
PRIOR ART FIG. 1b

MOTION COMPENSATED UPCONVERSION FOR PLASMA DISPLAYS

BACKGROUND OF THE INVENTION

1. Field of the Invention

The present invention relates to a method of driving a plasma display panel, the method comprising the steps of:

receiving a series of consecutive original images; and distributing information from each original image over a first plurality of sub-fields.

The invention also relates to a device for driving a plasma panel display and to a display apparatus.

2. Description of the Related Art

Plasma display panels (PDPS) are widely used for flat TV screens. These panels are simple to form a large unit, emit light by themselves, provide high display quality and achieve high response speed. In order to display an image on such a display unit, the so-called "sub-field driven method" is used. One image frame is shown in a number of successive periods called sub-fields. During a sub-field, an amount of light is emitted which is dependent on the weight of the sub-field. Each sub-field has a different weight. A desired intensity level for a pixel in the image is realized by controlling the specific sub-fields. The human eye sees the sum of the intensity levels of the enabled sub-fields within a field (i.e., an image) due to the integrating character of the human eye. In this way, a sub-field driven method using 8 sub-fields can display a maximum of $2^8$ halftone levels.

Plasma display panels suffer from several motion artifacts. One type of these motion artifacts is Dynamic False Contouring (DFC). DFC may occur in relatively large areas with little luminance differentiation. The DFC artifacts can sufficiently be reduced by using an adapted sub-field distribution. The remaining motion artifacts, such as double/colored edges and motion blur, are caused by the large time difference between the first and last sub-fields of a TV field period. To avoid these artifacts, a sub-field distribution is usually selected showing one central peak. The sub-fields with the highest values are placed in the middle of the frame. Another variant is placing the sub-fields in increasing order so that the sub-fields form a kind of staircase. The staircase variant is used in the CLEAR method, see "Development of new driving method for AC-PDPS: High-Contrast, Low Energy Address and Reduction of False Contour Sequence CLEAR", by T. Tokunaga et al., Proceedings of the IDW '99, page 787. An example of a distribution using the CLEAR method is shown in FIG. 1a. In FIG. 1a, a histogram is shown which represents the distribution of the sub-fields within one frame period. The first (white) bar represents a set-up of all plasma cells. After the setup phase, all cells are active. The other bars represent the luminance of a plasma cell during the consecutive sub-fields (SF1–SF8). During the first sub-field (SF1), the activated cells will have the lowest luminance (L1). After each sub-field, plasma cells that should be inactive are turned off, and the other cells will remain active. Each cell can be turned off only once per frame period. This means that each extra luminance level is created by using one extra sub-field. All cells are activated once during the set-up phase at the beginning of the frame period.

If the CLEAR method sub-field distribution is used at a 50 Hz frame rate, large area flicker will be visible. "Reduction of large area flicker in plasma display panels", by B. Salters et al., Proceedings of the SID 2001, page 1098, 2001, San Jose, and "A 50 Hz flicker reduction for PDP and evaluation system development", by H. Kuriyama et al, Proceedings of the SID 2001, page 1102, 2001, San Jose, disclose that this large area flicker can be reduced by using a sub-field distribution with two peaks. However, such a sub-field distribution will cause more motion artifacts, such as double/colored edges or motion blur.

Another sub-field distribution with an inherent reduction of the dynamic false contour is called LSC (Limited Sub-field Coding). This scheme is described in a U.S. Patent Application Ser. No. 10/082,005, filed Feb. 21, 2002 [PHNL010114EPP] assigned to the Assignee of the present application, entitled "METHOD AND UNIT FOR DISPLAYING AN IMAGE IN SUB-FIELDS". The idea is that for each increasing gray level, only a limited number of sub-fields change value, which will result in a reduction of the DFC motion artifacts.

In cathode ray tube (CRT) screens, large area flicker and motion artifacts are a well-known problem too. These artifacts are minimized by a concept called motion-compensated up-conversion, also known as Natural Motion, see "Video Processing for multimedia systems", by G. de Haan, University Press Eindhoven, ISBN 90-9014015-8. An extra image is inserted between two consecutive original images. In this way, the display frequency is doubled from, for example, 50 Hz to 100 Hz. The inserted images are corrected for motion, if motion is present in the video sequence.

Motion compensation is also used in plasma display panels. In "Motion Compensation in Plasma Displays", by R. van Dijk and T. Holtslag, Proceedings of the IDW 1998, page 543, motion vectors from a video sequence are used to reduce motion artifacts. Basically, all sub-fields are shifted on the motion vectors to make sure that the human eye will integrate all sub-fields in a correct way. This algorithm can give very good moving picture quality, but its implementation is very complex.

SUMMARY OF THE INVENTION

It is an object of the present invention to provide a method for displaying moving pictures on a PDP display with a relative simple system that shows very little motion artifacts.

The invention relates to a method of driving a plasma display panel, the method comprising the steps of:

receiving of a series of consecutive original images; and distributing information from each original image over a first plurality of sub-fields, characterized in that the method also comprises the steps of:

producing a series of new images;

inserting at least one of said series of new images between every two consecutive original images;

distributing information from a field of each new image over a second plurality of sub-fields;

generating a display image using a first group of sub-fields of an original image and a second group of sub-fields of at least one new image.

Furthermore, the invention relates to a device for driving a plasma display panel, the device comprising:

means for receiving of a series of consecutive original images;

means for distributing information from a field of each original image over a first plurality of sub-fields;

means for producing a series of new images;

means for inserting at least one of said series of new images between every two consecutive original images;

means for distributing information from a field of each new image over a second plurality of sub-fields;

means for generating a display image using a first group of sub-fields of an original image and a second group of sub-fields of at least one new image.

The present invention also relates to a display apparatus, comprising:

a device as described above; and a plasma display panel for displaying the image.

A method according to the invention reduces large area flicker with reduction of motion artifacts, like blur or double edges.

BRIEF DESCRIPTION OF THE DRAWINGS

Below, the invention will be explained with reference to the accompanying drawings, which are intended for illustration purposes only and not to limit the scope of protection as defined in the accompanying claims, in which:

FIGS. 1a and 1b show two sub-field distributions;

DESCRIPTION OF THE PREFERRED EMBODIMENTS

In the present invention, a sub-field distribution with two staircases is proposed, in contrast to only one single staircase in the CLEAR method (see FIG. 1a). Two staircases are created by introducing a second set-up phase. With this distribution, referred to as "double staircase distribution", no large area flicker will be observed.

In FIG. 1b, a histogram is shown which represents the distribution of the sub-fields within one frame period. The two highest (white) bars represent two set-ups of the plasma cells. The other bars represent luminances of a plasma cell during consecutive sub-fields (SF1–SF8). During the first sub-field (SF1), the activated cells will have the lowest luminance (L1). The fifth sub-field (SF5) represents the second luminance (L2). The second sub-field (SF2) represents the third luminance (L3), etc.

In an embodiment of the present invention, the sequence described above, is changed at sub-field SF4 and SF8, i.e., the fourth sub-field (SF4) represents the highest luminance (L8) and the last sub-field (SF8) represents the second highest luminance. In this way, sub-fields SF1–SF4 produce roughly the same amount of light as sub-fields SF5–SF8.

Of course, the human eye will experience higher luminances than L8 because it will integrate the luminances during a certain period of time. In fact, FIG. 1b shows a maximum gray level experienced by the eye during one field (period), i.e., all sub-fields are used.

In the present invention, an up-conversion, to preferably 100 Hz, as in CRTs with natural motion, is used, in addition with the double staircase distribution, as described above. It is not possible to display two complete images in a time period of 20 milliseconds on a PDP. This is because a present PDP will need this time period to address the cells and emit light. Therefore, the sub-field values are extracted from one of two images dependent on the position of the sub-field along the time axis.

Figure 2:
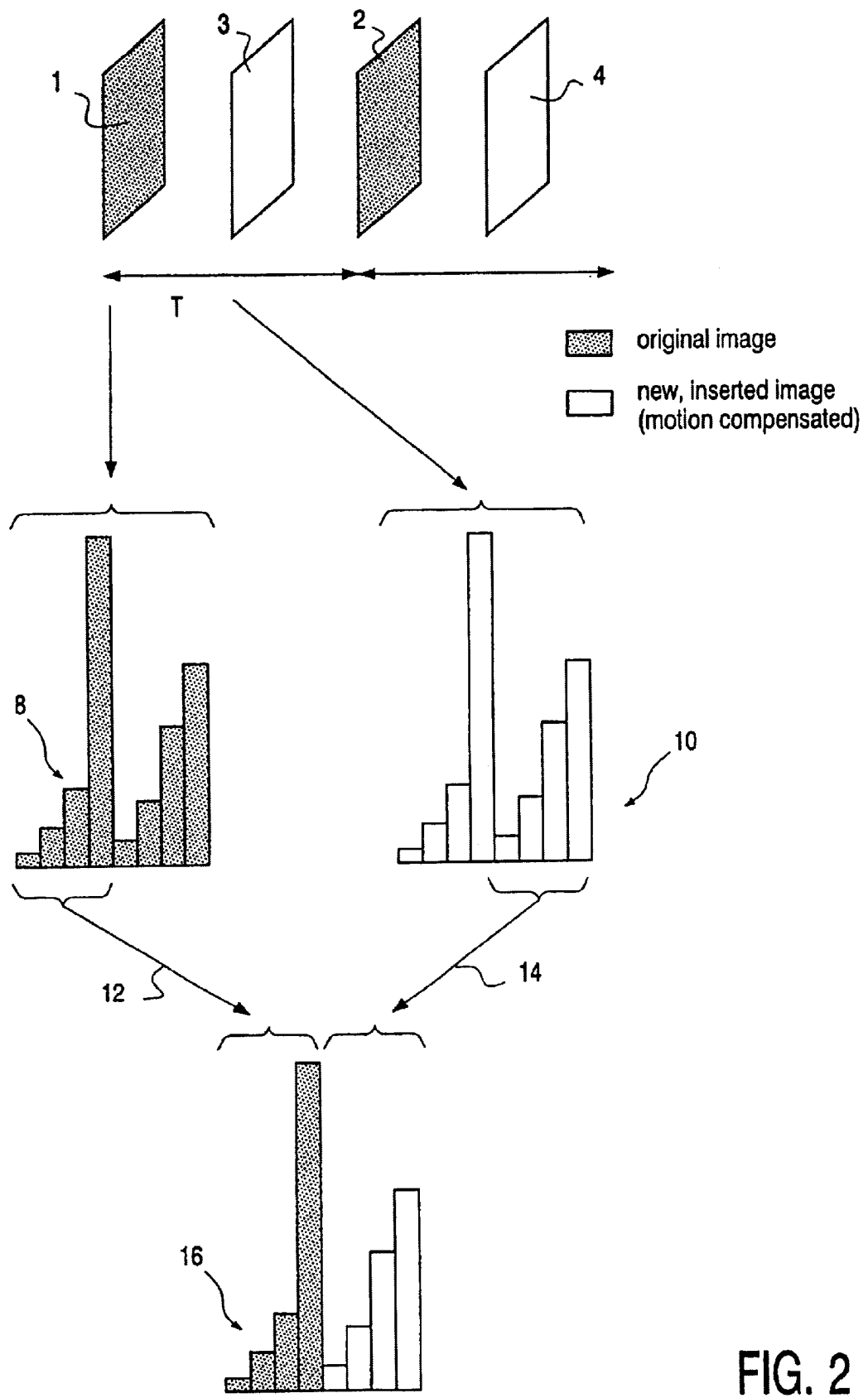
FIG. 2 shows the principle of combining sub-fields out of two images.

In FIG. 2, the extraction of sub-fields is explained. A video signal originally contains images 1, 2 every T milliseconds. In the invention, new image 3 is inserted between the original image 1, 2. New image 4 is inserted between original image 2 and its original successor (not shown). This means that the frequency of the video signal increases with a factor 2. The new images 3, 4 are motion compensated, for example, by a state-of-the-art device already used in CRTs. During one field period, one image will be shown. To show an image on a PDP, a sub-field method is used with, for example, 8 sub-fields per field. All images are converted to sub-field data using, e.g., the LSC distribution or the CLEAR method as described in the prior art, but the idea can be used for any sub-field distribution.

In one embodiment, original image 1 will be converted to sub-field coding 8, and new image 3 will be converted to sub-field coding 10. (Remark: of course not all pixels in an image will have the same gray level, so the codings per pixel are different.)

The next step is to combine sub-fields from the original image 1 with sub-fields from the new image 3. As shown in FIG. 2, four sub-fields SF1–SF4 are taken from the original image 1 and four sub-fields SF5–SF8 are taken from the new image 3. By doing this, motion artifacts resulting from the double staircase distribution will be reduced.

In this method, some sub-field data is thrown away. The sub-field group SF5–SF8 of the original image 1 and the sub-field group SF1–SF4 of the new image 3 are not used anymore.

If an image sequence is not moving, the original image 1 and original image 2 will be the same. This means that the image 3 will also be the same. By extracting the sub-fields as described above, the resulting gray level (see distribution 16) will be exactly the same as the gray level of the original image (see distribution 8). Hence, no artifacts will occur with still images.

Figure 3:
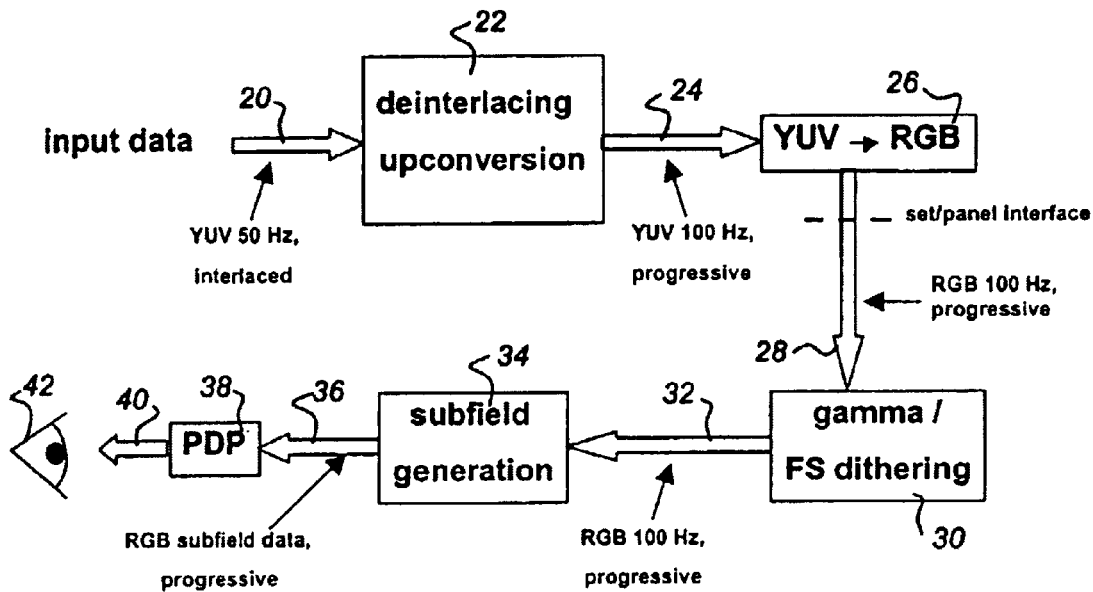
FIG. 3 is a block diagram of a first embodiment of the system of the present invention.

FIG. 3 is a block diagram of a first embodiment of an apparatus of the present invention. The apparatus, e.g., a television receiver, comprises a set and a panel. Both set and panel contain processing modules. The panel (i.e., the actual screen) receives Red Green Blue (RGB) signals from a tuner in the set.

Interlaced YUV input data 20 is de-interlaced and up-converted by means of a frame rate converter 22. Several commercial available modules exist, see "Video Processing for multimedia systems", by G. de Haan, University Press Eindhoven, ISBN 90-9014015-8.

The output is a progressive 100 Hz video stream 24. This video stream 24 is in standard YUV format. It is converted, by YUV converter 26, to a 100 Hz RGB signal 28. This 100 Hz RGB signal is transferred from the set to the panel, which is indicated by a dashed line. The next step is a gamma/Floyd Steinberg (FS) dithering performed by a video processor 30. The output of the video processor 30 is a processed 100 Hz progressive RGB signal 32. Next, sub-field generation is performed by sub-field generating module 34. In sub-field generating module 34, also the sub-field extraction from the two images 1, 3, as shown in FIG. 2, is done. The resulting RGB sub-field data 36 is used for driving a PDP 38 which will show an image 40 to be experienced by a human eye 42.

An advantage of this embodiment is the fact that the motion estimation and the up-conversion is performed in the set, and not in the panel. This is especially attractive because the used module is already incorporated in the set of present apparatus for de-interlacing purposes.

Figure 4:
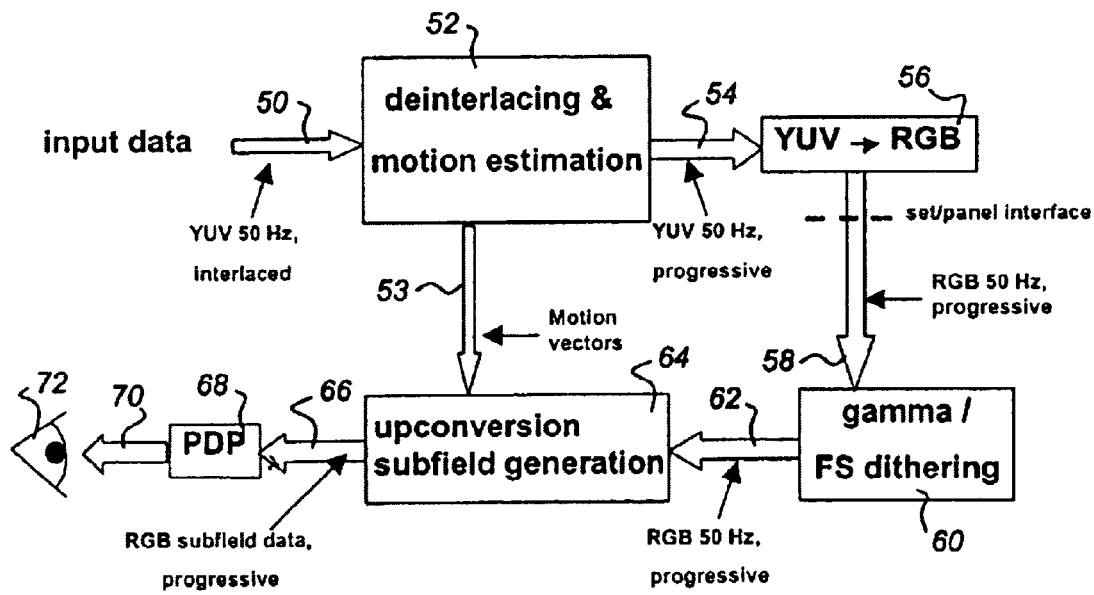
FIG. 4 is a block diagram of a second embodiment of the system of the present invention.

In FIG. 4, a block diagram of a second embodiment of the apparatus of the present invention is shown. Interlaced YUV input data 50 is de-interlaced by a frame rate converter 52. In frame rate converter 52, motion vectors 53 are calculated out of two consecutive original images using a state-of-the-art motion estimation process. Unlike in FIG. 3, no up-conversion is performed in this module. The outgoing signal is a progressive 50 Hz video stream 54. This video stream 54 is in YUV format. It is converted, by YUV converter 56, to a 50 Hz RGB signal 58. This 50 Hz RGB signal 58 is transferred from the set to the panel, which is indicated by a dashed line. The next step is a gamma/FS dithering performed by a video processor 60. The output of the video processor 60 is a processed 50 Hz progressive RGB signal 62. Next, sub-field generation is performed by a up-conversion/sub-field generation module 64. At this point, an up-conversion is performed by inserting new images between original images using the motion vectors 53 received from frame rate converter 52. In up-conversion/sub-field generation module 64, also the sub-field extraction from the two images 1, 3, as shown in FIG. 2, is done. The resulting RGB sub-field data 66 is used for driving a PDP 68 that will show an image 70, to be experienced by a human eye 72.

An advantage of this embodiment, compared to the one described above with reference to FIG. 3, is that all processing is done at 50 Hz.

The invention described above, may be used, e.g., in plasma display panels (PDPs), plasma-addressed liquid crystal panels (PALCs), liquid crystal displays (LCDs), Polymer LED (PLEDs), Electroluminescent (EL), used for personal computers, television sets, and so forth.

Figure 5A:
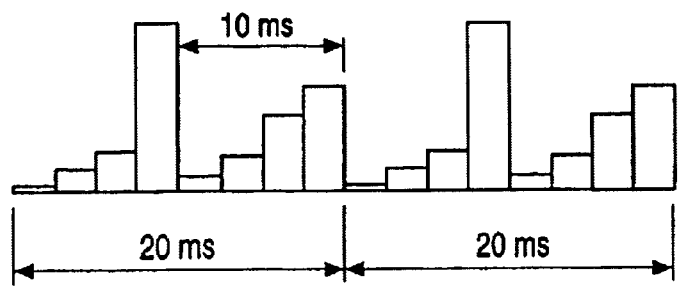
FIGS. 5a and 5b show sub-field distributions to explain timing differences between theoretical and practical frame periods.
Figure 5B:
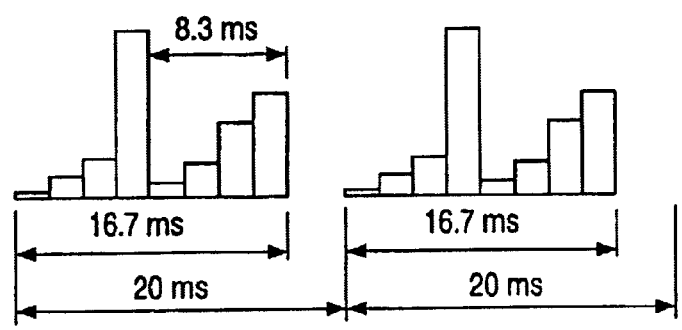

In FIGS. 5a and 5b, the timing difference of a theoretical (FIG. 5a) and practical (FIG. 5b) situation is shown. In the theoretical situation, the time difference between both sub-field peaks (e.g., 10 ms) that are generated from the different images is equal to one half video field period (e.g., ½×20 ms). This time difference could be the difference between the sub-fields with the highest values, or between the first sub-fields of both peaks. However, the optimal timing difference depends on the sub-field distribution. Normally, the up-converted new image is calculated exactly in the middle of the frame time (so after 10 ms at 50 Hz). If the sub-fields use the entire field period, this closely equals the time of the first sub-field of the second peak (which is generated with the up-converted image). The time difference between the original and up-converted images will, in that case, be correct. FIG. 5b shows the practical situation. In a configuration that can also display 60 Hz, 8 sub-fields only use 16.667 ms. The time difference between the two peaks is, in that case, smaller than 10 ms (i.e., 8.3 ms). The motion artifact reduction should be corrected for this difference.

Figure 6A:
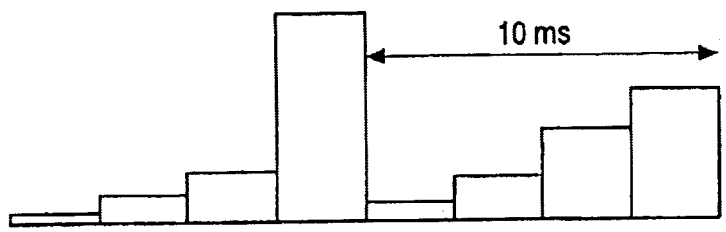
FIGS. 6a–6c show sub-field distributions to explain the influence of automatic power control.
Figure 6B:
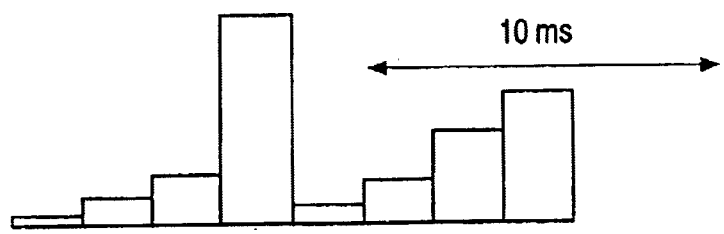
Figure 6C:
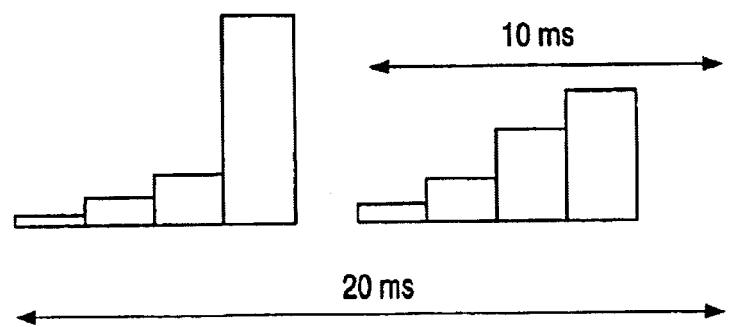

Another attention point concerning this timing is "automatic power control", which means that the number of sustain pulses is reduced when the picture load exceeds a certain value. This is shown in FIG. 6. Due to the reduction of the sustain time, the starting points of the sub-fields will move. It is best to keep the starting time of the first sub-field of the $2^{nd}$ staircase fixed at a certain time instant (preferably equal to the half frame time).

While the invention has been described in connection with preferred embodiments, it will be understood that modifications thereof within the principles outlined above will be evident to those skilled in the art, and thus the invention is not limited to the preferred embodiments but is intended to encompass such modifications. It is possible to interchange lines and columns. The invention is applicable to display devices in which the sub-field mode is applied. The invention can be implemented by means of hardware comprising several distinct elements, and by means of a suitably programmed computer.

What is claimed is:

1. A method of driving a plasma display panel, the method comprising the steps of:

receiving of a series of consecutive original images; and distributing information from each original image over a first plurality of sub-fields, characterized in that the method also comprises the steps of:

producing a series of new images;

inserting at least one of said series of new images between every two consecutive original images;

distributing information from a field of each new image over a second plurality of sub-fields; and generating a display image using a first group of sub-fields of an original image and a second group of sub-fields of at least one new image.

2. The method as claimed in claim 1, wherein each new image is produced using motion vectors which are calculated from a preceding and/or succeeding original image.

3. The method as claimed in claim 2, wherein each new image is produced in a frame rate converter.

4. The method as claimed in claim 2, wherein the at least one new image is produced in a sub-field generating module.

5. The method as claimed in claim 1, wherein sub-fields are distributed in fields according to a Limited Sub-field Code (LSC) distribution, said LSC distribution being characterized in that for each increasing luminance level, only a limited number of sub-fields change value.

6. The method as claimed in claim 1, wherein the first group of sub-fields constitute a first half part of the field of the original image, and the second group of sub-fields constitute a last half part of the field of the at least one new image.

7. The method as claimed in claim 1, wherein a sub-field distribution is used that uses at least one set-up phase per frame period and wherein for each increasing gray level, only one further sub-field is used.

8. A device for driving a plasma display panel, the device comprising:

means for receiving of a series of consecutive original images;

means for distributing information from a field of each original image over a first plurality of sub-fields;

means for producing a series of new images;

means for inserting at least one of said series of new images between every two consecutive original images;

means for distributing information from a field of each new image over a second plurality of sub-fields; and means for generating a display image using a first group of sub-fields of an original image and a second group of sub-fields of at least one new image.

9. The device as claimed in claim 8, the device comprising:

a frame rate converter for de-interlacing and up-conversion of input data, said frame rate converter producing a progressive video stream;

a YUV converter for converting the progressive video stream to a RGB signal;

a video processor for video processing the RGB signal to produce a processed progressive RGB signal; and a sub-field generating module for sub-field generation and sub-field extraction from the processed progressive RGB signal, and to generate said display image for said PDP module.

10. The device as claimed in claim 8, the device comprising:

a frame rate converter for de-interlacing input data and estimation of motion vectors, said frame rate converter producing a progressive video stream;

a YUV converter for converting the progressive video stream to a RGB signal;

a video processor for video processing the RGB signal to produce a processed progressive RGB signal; and an up-conversion/sub-field generation module for up-conversion of and sub-field generation from the processed progressive RGB signal, to generate said display image for said PDP module.

11. A display apparatus, comprising:

a device as defined in claim 8; and a plasma dislay module for displaying the display image.

* * * * *